United States Patent
Reif et al.

(10) Patent No.: US 8,127,634 B2
(45) Date of Patent: Mar. 6, 2012

(54) DRIVING DEVICE

(75) Inventors: Thomas Reif, Kobern-Gondorf (DE); Klaus Schmidt, Mendig (DE)

(73) Assignee: Stabilus GmbH, Koblenz (DE)

( * ) Notice: Subject to any disclaimer, the term of this patent is extended or adjusted under 35 U.S.C. 154(b) by 358 days.

(21) Appl. No.: 12/496,320

(22) Filed: Jul. 1, 2009

(65) Prior Publication Data

US 2010/0162839 A1 Jul. 1, 2010

(30) Foreign Application Priority Data

Jul. 3, 2008 (DE) .................. 10 2008 031 228

(51) Int. Cl.
*F16H 3/06* (2006.01)
*F16H 27/02* (2006.01)
*F16H 29/02* (2006.01)
*F16H 29/20* (2006.01)

(52) U.S. Cl. ..................... 74/89.38; 74/89.34
(58) Field of Classification Search .............. 74/89.34, 74/89.38; 192/56.1; 464/30, 41
See application file for complete search history.

(56) References Cited

U.S. PATENT DOCUMENTS

| 2,146,253 | A | * | 2/1939 | Erwood | 464/82 |
| 2,302,110 | A | * | 11/1942 | Dow et al. | 464/41 |
| 4,846,011 | A | * | 7/1989 | Gaffney | 74/89.38 |
| 5,707,291 | A | * | 1/1998 | Fuller | 464/30 |
| 6,443,846 | B1 | * | 9/2002 | Dziedzic et al. | 464/41 |
| 2006/0276246 | A1 | * | 12/2006 | Needes et al. | 464/30 |

* cited by examiner

*Primary Examiner* — Justin Krause
(74) *Attorney, Agent, or Firm* — Cozen O'Connor

(57) ABSTRACT

A driving device with a first and second fastening device which can be connected to a stationary base part, particularly a vehicle body, or can be connected to a movable structural component part, particularly a hatch or door of a vehicle, a spindle drive which has a threaded spindle and a spindle nut arranged on the threaded spindle and by which the first fastening device and the second fastening device are movable axially relative to one another, and a rotary drive which drives the spindle drive in rotation by an overload protection device, and the rotationally rigid connection thereof can be canceled when a determined torque is exceeded. The overload protection device is a ring element arranged on a driveshaft of the rotary drive.

9 Claims, 3 Drawing Sheets

DRIVING DEVICE

BACKGROUND OF THE INVENTION

1. Field of the Invention

The invention is directed to a driving device with a first fastening device connectable to a stationary base part, particularly a vehicle body, or connectable to a movable structural component part, particularly a hatch or door of a vehicle, a second fastening device which can be connectable to the movable structural component part or to the stationary base part, a spindle drive which has a threaded spindle and a spindle nut arranged on the threaded spindle and by which the first fastening device and the second fastening device are movable axially relative to one another, and a rotary drive which drives the spindle drive in rotation by means of an overload protection device, wherein the rotationally rigid connection thereof can be canceled when a determined torque is exceeded. The overload protection device comprises a ring element which is arranged on a driveshaft of the rotary drive.

2. Description of the Related Art

In driving devices of the type mentioned above, it is known to design the overload clutch as a frictionally-engaging clutch. When in a basic position or intermediate position, a manual actuation is carried out whereby the frictional engagement is overcome by the application of force. The forces necessary for this purpose must be absorbed by the construction on which the driving device is arranged. When acted upon by high forces and/or when high acceleration is applied, the load may be so great that the connection elements on the vehicle side can be damaged.

SUMMARY OF THE INVENTION

An object of the invention to provide a driving device that prevents damage to the structural components of the driving device and of the connection elements on the vehicle side or of the vehicle body, and has a compact and simple construction at the same time.

This object is met according to one embodiment of the invention in that the overload protection device comprises a ring element arranged on a driveshaft of the rotary drive.

In particular, the rotary drive comprises an electric motor.

In one embodiment, the rotary drive comprises a gear unit so that the high speed of the motor at a lower torque can be stepped down to a lower speed at a higher torque.

In one embodiment of the invention, the driveshaft projects into an adapter sleeve which is connected to the threaded spindle.

According to one embodiment of the invention, a groove which extends radially in the outer surface of the driveshaft and has a groove base and two groove walls formed in the area of the driveshaft located in the adapter sleeve.

The driveshaft is preferably made of an at least partially hardened material to achieve a long operating life and a reliable operation.

In one embodiment, at least the area of the groove base and groove walls comprise hardened material.

According to one embodiment of the invention, the ring element is inserted into the groove so that the ring element is fixed in axial direction. Further, no additional installation space is required by an arrangement of this kind.

The ring element advantageously comprises a metal strip provided with stamped webs and is bent to form a ring.

According to one embodiment of the invention, the stamped webs are oriented toward the adapter sleeve in the installed state of the ring element.

Costs are kept very low by means of the features mentioned above because no positive-engagement parts are required and the ring element, as shaped sheet metal part, is a very economical structural component part.

The weight of the ring element is in the range of a few grams which is a great advantage compared to other overload clutches.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Examples of the invention are shown in the drawing and described more fully in the following.

DETAILED DESCRIPTION OF THE PRESENTLY PREFERRED EMBODIMENTS

Figure 1:
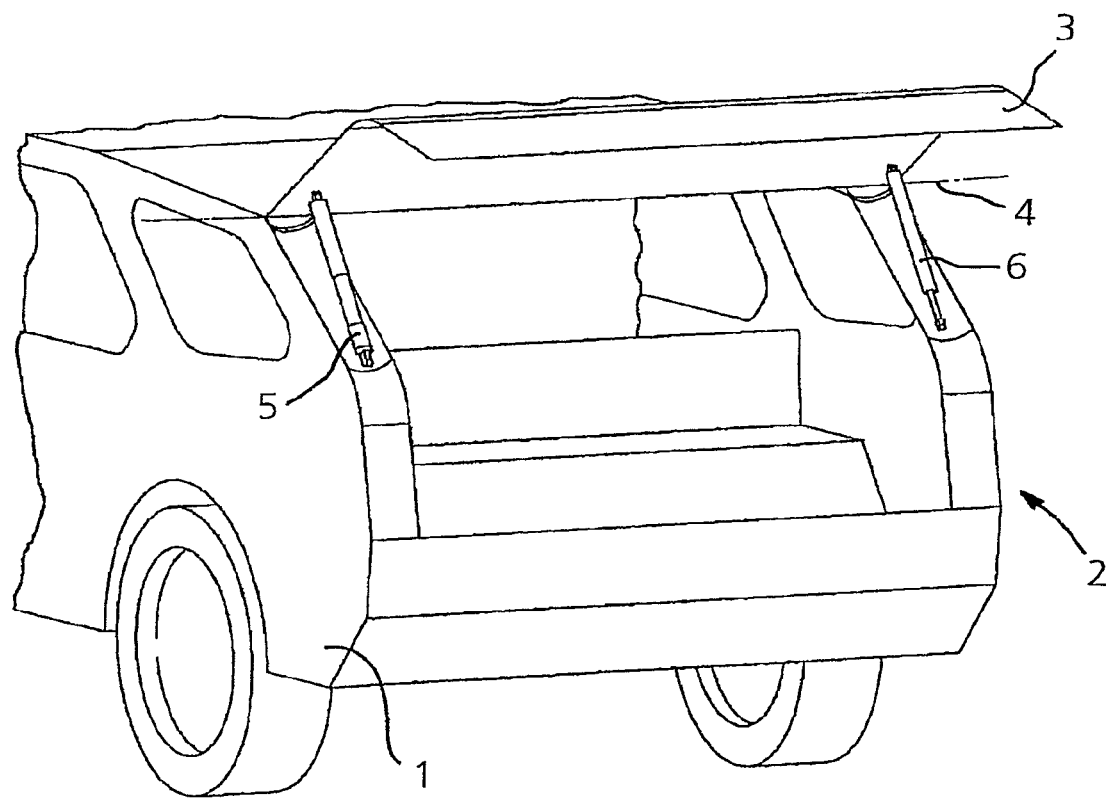
FIG. 1 is a perspective view of motor vehicle with a hatch driven in a swivelable manner.

FIG. 1 is a view of a motor vehicle with a body as a base part 1 and a movable part 3 which closes or opens an opening 2 in the base part 1 and which is constructed as a rear hatch.

The structural component part which is movable relative to the base part 1 can also be a front hood or engine hood, a vehicle door or a corresponding application.

The movable structural component part 3 is mounted on a horizontal swiveling axis 4 extending transverse to the vehicle. A first driving device 5 is arranged at one side of the movable structural component part 3. A second driving device 6 is arranged at the opposite side of the hatch 3.

Figure 2:
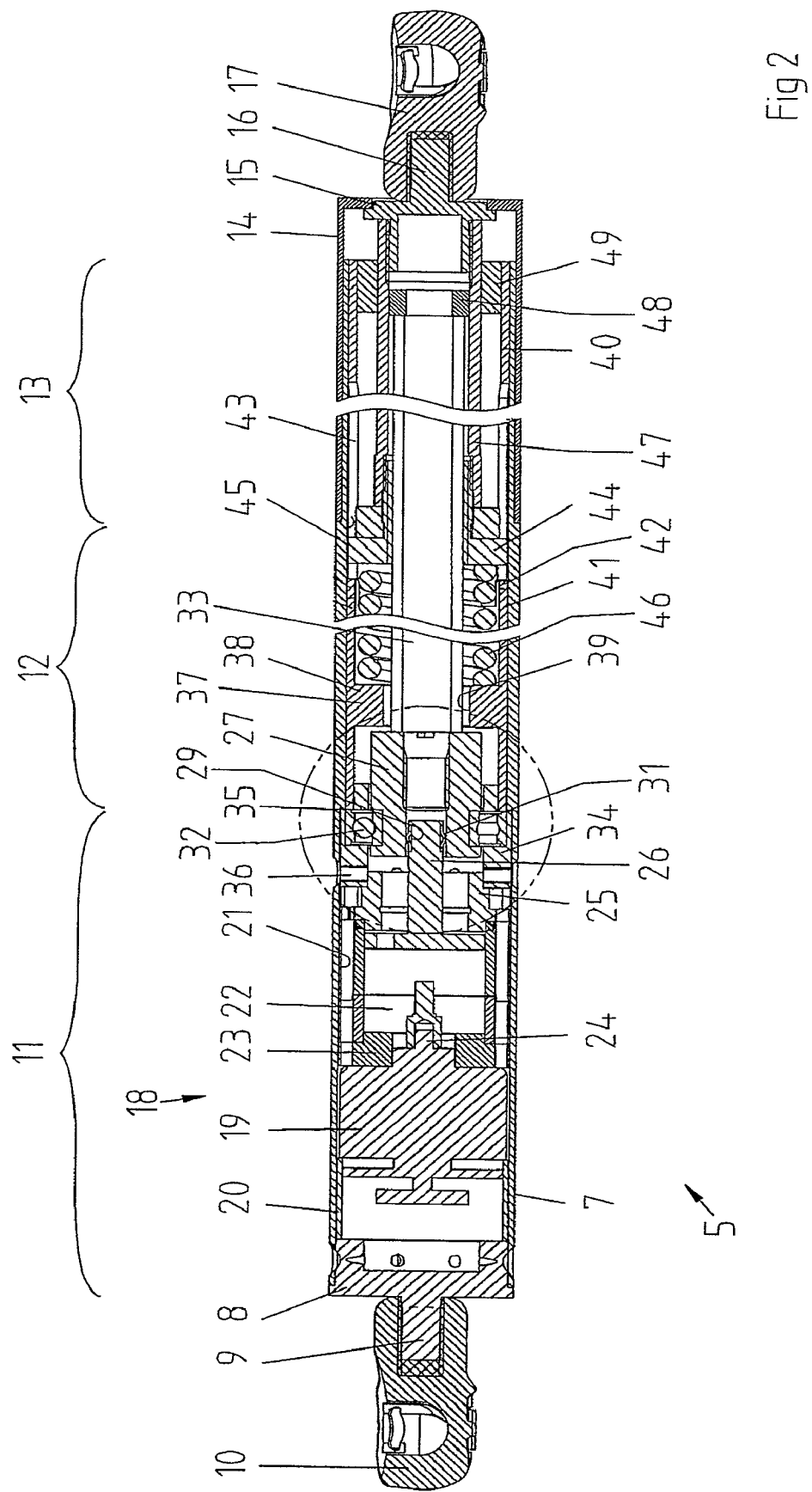
FIG. 2 is a longitudinal section through a driving device according to one embodiment of the invention.

By way of example, FIG. 2 shows an embodiment form of one of the two driving devices in the form of an electromechanical driving device which will be associated with the first driving device 5 in the following description for the sake of simplicity.

The first driving device 5 has a tubular housing 7 which is closed at one end by a base piece 8. The base piece 8 has a threaded pin 9 on which a first fastening device 10 is screwed.

The housing 7 has a first portion 11, a second portion 12, and a third portion 13. The first portion 11 has a larger inner diameter than the second portion 12 while its outer diameter remains the same. In contrast, the third portion 13 has a smaller outer diameter than the second portion 12 but the same inner diameter.

A protective tube 14 whose outer diameter substantially corresponds to the outer diameter of the second portion 12 of the housing 7 is arranged over the third portion 13 of the housing 7. The protective tube 14 is closed by a base piece 15 at its end remote of the housing 7. The base piece 15 has a threaded pin 16 on which a second fastening device 17 is screwed. The base piece 8 has a threaded pin 9 for fastening device 10.

As is shown in FIG. 2, the fastening devices 10 and 17 are ball sockets, but knuckle eyes or other suitable structural component parts, can also be used. Alternatively, the fastening devices is connected to the respective base pieces 8 and 15 so as to form one piece or can be connected by other joining techniques known to the person skilled in the art, for example, welding or deforming, so that the first driving device 5 is connectable in an articulated manner to a stationary structural component part of the body or base part 1 of a motor vehicle and at a movable structural component part 3 of the motor vehicle that is formed as a hatch.

A rotary drive 18 is arranged in the interior of the housing 7 in the area of the first portion 11. The rotary drive 18 comprises an electric motor 19, a sensor device which is accommodated in a sensor housing 20, and a gear unit 22 accommodated in a gear unit housing 21. The electric motor 19 is supported by the sensor housing 20 at the end of the housing 7 that is closed by the base piece 8. The gear unit housing 21 is supported at the electric motor 19 by an adapter sleeve 23. The gear unit 22 arranged in the gear unit housing 21 is driven by a motor driveshaft 24. Further, the motor driveshaft 24 projects into the sensor housing 20 on the side located opposite to the gear unit housing 22. The connection lines comprising the power supply lines and control lines, not shown, extend from the sensor housing 20 through the base piece 8 out of the housing 7.

The gear unit housing 21 is closed by a first housing cover 25 at the side located opposite to the electric motor 19. A gear shaft 26 forming the driveshaft of the rotary drive 18 extends through the housing cover 25 and projects into an adapter sleeve 27.

Depending on the construction of the electric motor, gear unit 22 can be omitted. In that case, the motor driveshaft 24 forms the driveshaft of the rotary drive 18.

Figure 3:
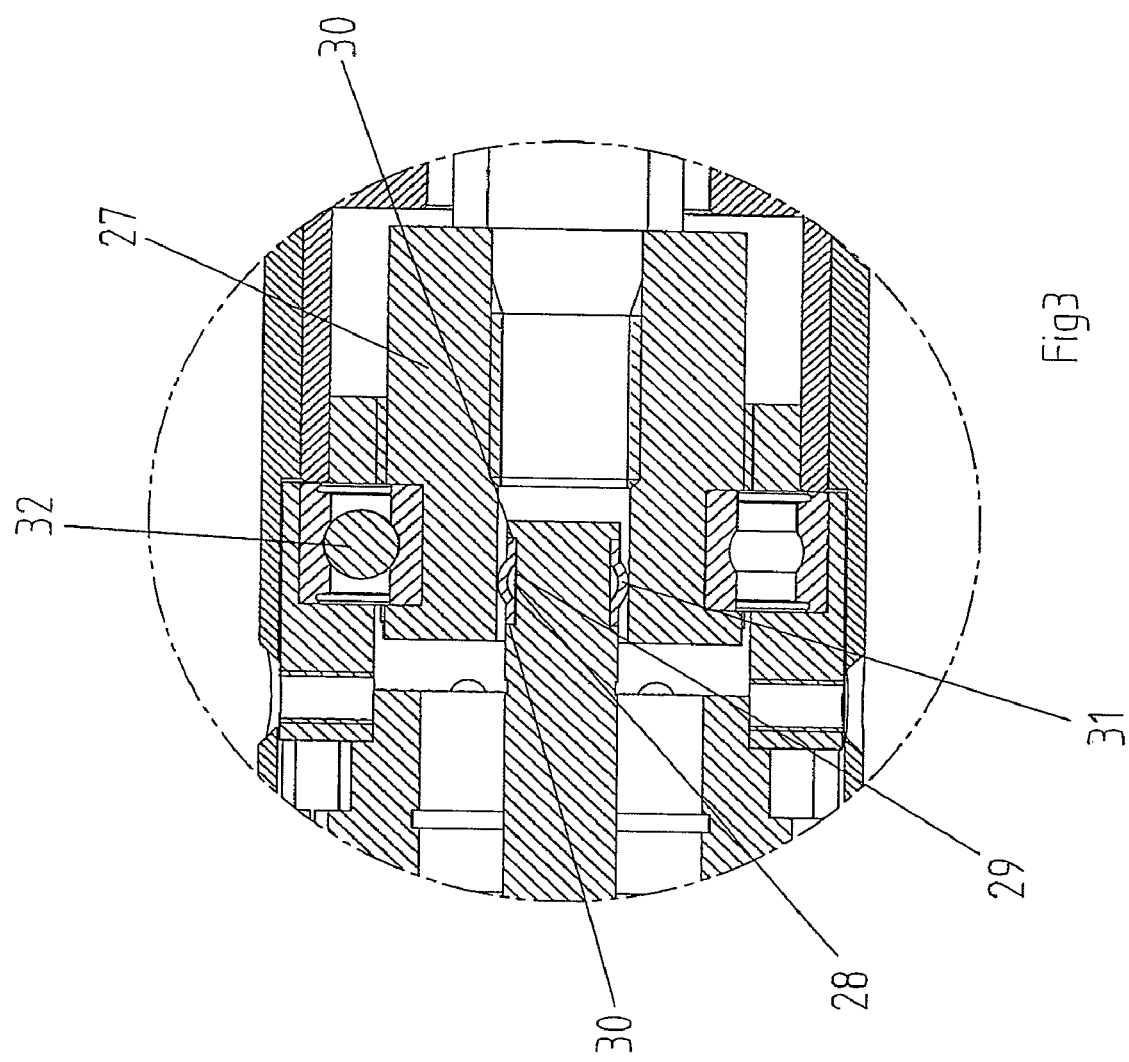
FIG. 3 is a portion of the driving device according to FIG. 2.

As can be seen more clearly from FIG. 3, a groove 28, which extends radially in the outer surface of the gear shaft 26 and has a groove base 29 and two groove walls 30, is formed substantially in the area of the gear shaft 26 located in the adapter sleeve 27. According to one embodiment of the invention, at least the area of the groove base 29 and possibly of the groove walls 30 comprise hardened material. However, the entire gear shaft 26 can also be made from hardened material. A ring element 31 ensures that a transmission of force takes place from the gear shaft 26 to the adapter sleeve 27 connected to a spindle drive is fitted into the groove 28.

The adapter sleeve 27 projects through a bearing 32 and is connected to the latter so as to be fixed with respect to rotation relative to it. The adapter sleeve 27 is connected to a threaded spindle 33 so as to be fixed with respect to rotation relative to it at the side of the adapter sleeve 27 lying opposite to the gear shaft 26. The bearing 32 is arranged in turn in a bearing sleeve 34 which is supported at the gear unit 22 or at the housing cover 25 on one side and at a step 35 on the other side. The step 35 is formed by the different inner diameters of portions 11 and 12. Accordingly, the rotary drive 18 is fixed in axial direction within the first portion 11 of the housing 7 together with the bearing 32 of the threaded spindle 33. Parts of the rotary drive 18 are connected to the housing 7 by means of screws 36 or catches in such a way that these parts cannot rotate relative to the housing.

A spring sleeve 37 is supported at the bearing 32 or at the bearing sleeve 34, substantially in the second portion 12, so as to contact the inner wall of the housing 7. A wall 38 with a bore hole 39 is formed in the interior of the spring sleeve 37, the threaded spindle 33 projecting through this bore hole 39. The spring sleeve 37 is lengthened by a guide tube 40 starting from the second portion 12 of the housing 7 in direction of the third portion 13 to the end of the housing 7. The spring sleeve 37 has recesses 41 at its end near the guide tube 40. Projections 42 formed at the end of the guide tube 40 near the spring sleeve 37 engage recesses 41, so that the spring sleeve 37 and guide tube 40 are prevented from rotating relative to one another. Further, the guide tube 40 has at least one guide device 43 which extends in axial direction and which is formed as a slot. A projection 45 formed at a spindle nut 44 projects into this guide device 43.

A spring element 46 which partially surrounds the threaded spindle 33 extends from the side of the wall 38 remote of the bearing 32 in direction of the third portion 13 of the housing 7 contacts the spindle nut 44 running on the threaded spindle 33, in particular when the first driving device 5 is inserted, i.e., the hatch 3 is located in its position in which it is almost completely closed. The spring element 46 tends to force the spindle nut 44 away from the wall 38 when opening the hatch 3 from its completely closed position and accordingly reinforces the rotary drive 18 at least along the initial centimeters of the hatch opening movement.

A spindle tube 47 is guided in the guide tube 40 so as to be axially movable by the spindle nut 44, the spindle tube 47 being arranged with one end at the spindle nut 44 and with its other end at the base piece 15 of the protective tube 14. At the end near the base piece 15, the threaded spindle 33 has a guide ring 48 arranged in the spindle tube 47 so that the threaded spindle 33 is prevented from swinging radially.

Another guide ring 49 which likewise prevents a radial swinging of the telescopically extensible structural component parts forms a stable protection against buckling or bending is arranged between the spindle tube 47 and the end of the housing 7 near the connection element 17.

In the moved in state, the second housing part 14 overlaps the entire portion 13, this portion 13 extending substantially completely through the second housing part in this position.

Figure 4:
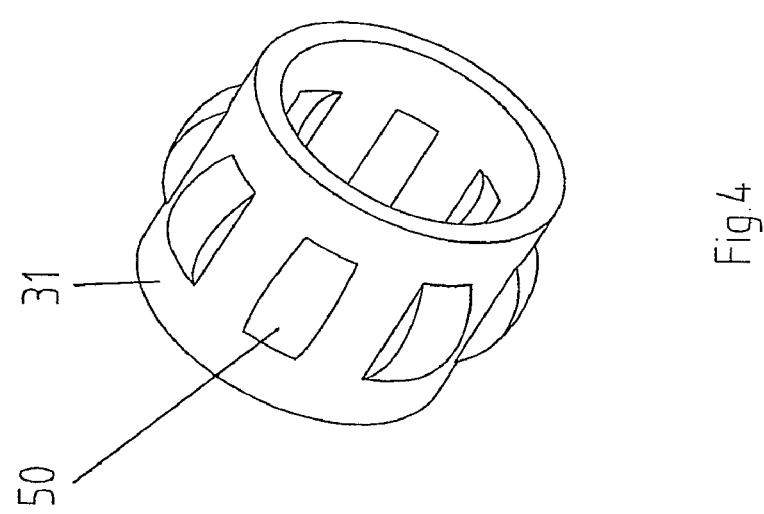
FIG. 4 is a detail of a structural component part of the driving device according to FIG. 2.

The ring element 31 is shown in detail in FIG. 4. In a preferred embodiment form, a metal strip is provided with stamped webs 50 and is bent to form a ring whose inner diameter substantially corresponds to the diameter of the groove base 29 of the groove 28 formed in the gear shaft 26 or is slightly smaller. In the installed state of the ring element 31, the stamped webs 50 are oriented toward the adapter sleeve 27.

If the driving device is overstressed by manual force acting, against the driving force generated by the driving device, applied to the hatch 3, or if the hatch is suddenly actuated by manual forces exceeding the driving forces, the force acting on the ring element 31 is greater than the frictional force between the ring element 31 and the gear shaft 26 or adapter sleeve 27, so that the ring element 31 slips on the gear shaft 26 into the groove 28, and the transmission of force from the gear shaft 26 to the adapter sleeve 27 connected to the threaded spindle 33 is interrupted.

The extent of the frictional engagement between the gear shaft 26 and the adapter sleeve 27 is preferably defined by the geometric contour (length, diameter, surface contour) of the ring element 31. Accordingly, there is a decoupling of the overload between the rotary drive 18, comprising the electric motor 19 and the gear unit 22, and the spindle drive and the hatch, especially in the spindle drive.

Another advantage of this overload clutch is that the ring element can be used in an uninterrupted manner. After the overload clutch is released, it can be used immediately without play and without repositioning. Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A driving device comprising:
a first fastening device connectable to one of a stationary base part of a vehicle body and a movable structural component part of the vehicle;
a second fastening device connectable to the other of the stationary base part of the vehicle body and the movable structural component part of the vehicle;
a spindle drive comprising
a threaded spindle; and
a spindle nut arranged on the threaded spindle configured to move the first fastening device and the second fastening device axially relative to one another;
a rotary drive having a driveshaft configured to drive the spindle drive in rotation, a portion of the driveshaft projects into an adapter sleeve coupled to the threaded spindle; and
an overload protection device comprising a ring element arranged on the driveshaft of the rotary drive configured to couple the rotary drive and the spindle drive, the overload protection device further configured to cancel a rotationally rigid connection between the rotary drive and the spindle drive when a predetermined torque is exceeded.

2. The driving device according to claim 1, wherein the rotary drive is an electric motor.

3. The driving device according to claim 2, wherein the rotary drive comprises a gear unit.

4. The driving device according to claim 1, wherein a radially extending groove in an outer surface of the driveshaft has a groove base and two groove walls formed in the portion of the driveshaft that projects into the adapter sleeve.

5. The driving device according to claim 4, wherein the driveshaft at least partially comprises a hardened material.

6. The driving device according to claim 4, wherein at least the groove base and groove walls comprise a hardened material.

7. The driving device according to claim 4, wherein the ring element is inserted into the groove.

8. The driving device according to claim 7, wherein the ring element comprises a metal strip having stamped webs, the metal strip being bent to form a ring.

9. The driving device according to claim 8, wherein the stamped webs are oriented toward the adapter sleeve in the installed state of the ring element.

* * * * *